UNITED STATES PATENT OFFICE.

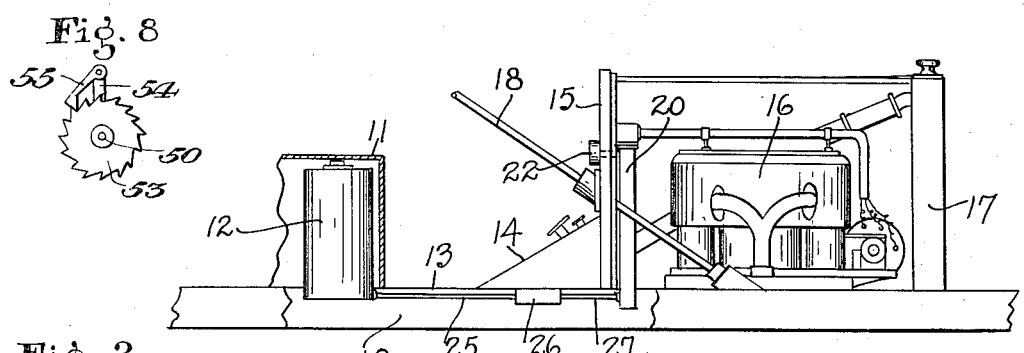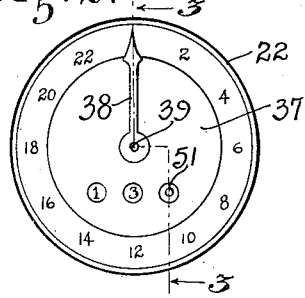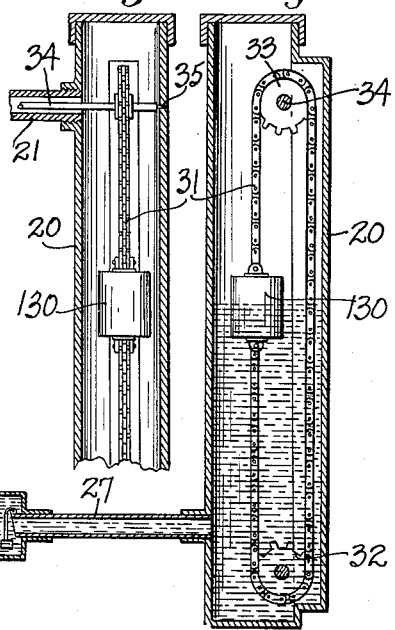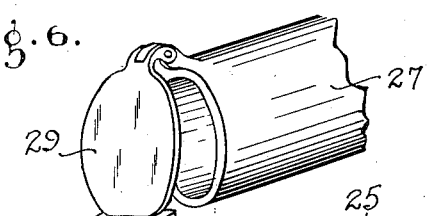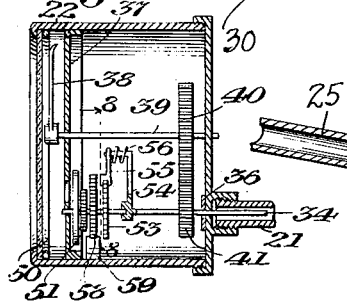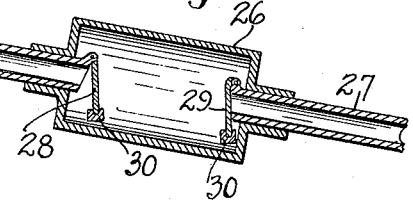

WILLIAM HAMPE, THEODORE M. HAMPE, AND EUGENE H. ROLLIN, OF INDIANAPOLIS, INDIANA.

FLUID-GAGE FOR AUTOMOBILES AND THE LIKE.

1,162,352.  Specification of Letters Patent. Patented Nov. 30, 1915.

Application filed May 6, 1912. Serial No. 695,566.

*To all whom it may concern:*

Be it known that we, WILLIAM HAMPE, THEODORE M. HAMPE, and EUGENE H. ROLLIN, citizens of the United States, and residents of Indianapolis, county of Marion, and State of Indiana, have invented a certain useful Fluid-Gage for Automobiles and the like; and we do hereby declare that the following is a full, clear, and exact description thereof, reference being had to the accompanying drawings.

The object of this invention is to provide satisfactory and practical means for indicating the amount of gasolene or other fluid in a tank, and has been made with particular reference to use in automobiles so as to indicate the number of gallons in the gasolene tank, and also to prevent the gage from being affected by the oscillation of the automobile.

One feature of the invention consists in providing a vertical tube in connection with the fluid tank so that the fluid will stand at about the same elevation in said tube and tank, and arranging a float in said tube, and means actuated by said float for controlling and operating an indicator located at any suitable place. In the case of an automobile, the tank is usually under the seat and the indicator should be on the dash in front of the seat. Hence, the connection from the tank to the gage must pass under the floor of the automobile, and, therefore, the ordinary fluid gage would not be possible on account of the necessary construction of the automobile. That difficulty is obviated by the present invention.

Another feature of the invention consists in providing an automatic valve construction in the communication between the tank and gage tube for preventing the fluid in the latter from being affected by oscillation of the total structure or automobile.

The nature of the invention will be understood from the accompanying drawings and the following description and claim:

In the drawings, Figure 1 is a side elevation of a portion of the chassis of an automobile with the dash and a part of the seat thereon, parts being broken away. Fig. 2 is a front elevation of the indicator. Fig. 3 is a section on the line 3—3 of Fig. 2. Fig. 4 is a central vertical section through the upper part of the gage tube, longitudinally of the automobile, parts being broken away. Fig. 5 is a central vertical section through the gage tube in a plane at right angles to that shown in Fig. 4, and transversely of the automobile, and with vertical longitudinal section through a part of the connection between the gage tube and the fluid tank, parts being broken away. Fig. 6 is a perspective view of one end of one of the pipes in said connection between the tank and gage tube, with the valve open. Fig. 7 is a longitudinal vertical section through a portion of the connection between said tank and tube, showing the same in a tilted position, parts being broken away. Fig. 8 is a section on the line 8—8 of Fig. 3.

There is shown in the drawings herewith a chassis 10 of an automobile having a seat 11 under which there is a gasolene tank 12. The horizontal portion of the floor of the automobile is located at 13 and the inclined portion at 14.

15 is the dash, 16 is the engine, 17 is the radiator and 18 is the steering shaft.

A gage tube 20 is vertically arranged immediately in front of the dash and from the upper part of that gage tube there is a pipe 21 leading to the casing 22 of an indicator on the front part of the dash and which is in end elevation to render the same easily readable by the operator sitting on the seat 11. The lower portion of the gage tube 20 is connected with the lower portion of the tank 12 by a connection located below the floor of the automobile and consisting of a tube 25 running from the tank to a valve chamber 26 and a tube 27 running from the valve chamber 26 to the lower end of the gage tube 20. In this way the fluid will stand in the tank and gage tube at the same level. But in order to prevent the fluid from changing level in the gage tube by reason of any oscillatory movement of the automobile, there is provided in the valve chamber 26 two valves 28 and 29 similarly constructed and mounted in connection with the ends of the two pipes 25 and 27, respectively. The ends of said pipes are oppositely beveled and the lower ends of the valves are weighted by weights 30, so that when the valve chamber 26 is in the horizontal position, as seen in Fig. 5, the two valves will hang in an open position and the fluid will pass through the pipes and valve chamber without difficulty. If, however, the valve chamber and pipes be tilted forwardly to the position shown in Fig. 7, the valve 29 will close the pipe 27 and prevent fluid rushing into the gage tube. If the parts should be tilted rearwardly or the reverse of what appears in Fig. 7, then the valve 28 would close the pipe 25 and prevent fluid from running back from the gage tube to the tank. Hence, there is a substantially uniform level maintained in both the tank and gage tube, despite the plunging or oscillation of the automobile.

Within the gage tube 20 there is a float 130 which rides upon the surface of the fluid therein and actuates a sprocket chain 31 connected with it which lies over an idler 32 at the lower end of the gage tube and a sprocket wheel 33 at the upper end. The sprocket wheel 33 is mounted on a shaft 34 which projects through the pipe 21 into the indicator casing. The shaft 34 has a bearing 35 at one end in the wall of the gage tube and at the other end in a bearing 36 within the casing 22. There is a dial 37 with a series of numerals on the same near the periphery to indicate gallons and there is an indicator or hand 38 movable over said dial and pointing toward said numerals and mounted on a shaft 39 which extends through the dial 37. The shaft 39 carries a gear 40 which meshes with a smaller gear 41 on the inner end of the shaft 39 and by the means so far described said indicator 38 is actuated. Assuming that the hand is at zero when the fluid in the tube 20 is on a level with the bottom of the tank 12, the addition of every gallon in the tank will cause a corresponding upward movement of the float 130 and a corresponding movement of the indicator 38. While the indicator in Figs. 2 and 3 is shown at zero, still with the amount of fluid in the tube shown in Fig. 5, the indicator would be actuated from zero and would point probably to "16," indicating that there were sixteen gallons of gasolene in the machine. In order to mount the sprocket wheel 32 in the bottom of the tube 20, said tube must extend somewhat lower than the tank 12 so that there will always be left in the bottom of the tube 20 some gasolene extending up substantially as high as the bottom of the tube 27 and that is the lower limit of the movement of the float 130. There is a short shaft 50 within the casing 22 and in alinement with the shaft 34 and upon one end of said shaft there is a units counting wheel 51 and upon the opposite end, a ratchet wheel 53. An arm 54 is secured upon the end of the shaft 34 with a pawl 55 pivotally mounted upon the outer end thereof and pressed by a spring 56 into engagement with the teeth of the ratchet 53. The teeth in said ratchet are so cut that movement of the shaft 34 in one direction will cause the pawl 55 to engage and turn the ratchet and operate the counter, while with the reverse movement of the shaft 34, the pawl will drag over the teeth of said ratchet and not influence the counting mechanism. A gear 51 on the front shaft 50 drives the tens and hundreds counting wheels in succession in a manner commonly used in adding machinery and arranged so that each revolution of one of the adding wheels will move the ends only one-tenth of a revolution. Since such mechanism is a familiar one, the details are not here shown. Backward movement of the front shaft 50 and the counting wheels is prevented by a notched wheel 58 secured on said shaft which is engaged by a spring 59 secured to the bottom of the case 22. The counting wheels have numerals on them which are exposed through openings 52 in the dial, as shown in Figs. 2 and 3. This adding mechanism is in order to show the operator the number of gallons he has used since the same was started at zero. The adding means here shown would indicate up to the limit of 999 gallons. In this way the amount of gasolene used in a trip or season may be determined.

We claim as our invention:

A fluid gage including a tank, a vertical tube, a float within said tube for actuating the indicator, a connection from the lower end of said tank, a connection from above the lower end of said tube, the adjacent ends of said connections being divergingly inclined downward and away from a vertical line, a valve pivoted at its upper end to the upper end of each tube at the opening, and a chamber surrounding the ends of said tubes and said valves, whereby when said tubes and chamber are level said valves will be open and when inclined one of said valves will be closed and one open.

In witness whereof, we have hereunto affixed our signatures in the presence of the witnesses herein named.

WILLIAM HAMPE.
THEODORE M. HAMPE.
EUGENE H. ROLLIN.

Witnesses:
  O. M. McLaughlin,
  G. H. Boink.